United States Patent
Gonzalez et al.

(10) Patent No.: US 11,999,411 B2
(45) Date of Patent: Jun. 4, 2024

(54) ENERGY ABSORBER FOR FRONT-END VEHICLE PROTECTION

(71) Applicant: Nissan North America, Inc., Franklin, TN (US)

(72) Inventors: Alejandro Enrique Gonzalez, Toluca (MX); Md Hafizur Rahman, Troy, MI (US); Freddy Miranda, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 174 days.

(21) Appl. No.: 17/464,266

(22) Filed: Sep. 1, 2021

(65) Prior Publication Data

US 2023/0060152 A1 Mar. 2, 2023

(51) Int. Cl.
| | | |
|---|---|---|
| *B62D 21/15* | (2006.01) | |
| *B60K 11/08* | (2006.01) | |
| *B60R 11/00* | (2006.01) | |
| *B60R 11/04* | (2006.01) | |
| *B60R 19/48* | (2006.01) | |

(52) U.S. Cl.
CPC ............ *B62D 21/152* (2013.01); *B60K 11/08* (2013.01); *B60R 11/04* (2013.01); *B60R 19/48* (2013.01); *B60R 2011/004* (2013.01)

(58) Field of Classification Search
CPC .... B62D 21/152; B62D 25/085; B60K 11/08; B60R 11/04; B60R 19/48; B60R 2011/004; B60R 19/52; B60R 2019/525
See application file for complete search history.

(56) References Cited

U.S. PATENT DOCUMENTS

| | | | |
|---|---|---|---|
| 4,598,001 A | 7/1986 | Watanabe et al. | |
| 5,799,991 A | 9/1998 | Glance | |
| 9,673,517 B2 | 6/2017 | Tran et al. | |
| 9,860,430 B1 * | 1/2018 | Penza | H04N 23/57 |
| 10,281,113 B1 * | 5/2019 | Salter | B60R 19/483 |
| 11,046,257 B1 * | 6/2021 | Fattouche | B60R 19/52 |
| 11,433,834 B2 * | 9/2022 | Novoa Liceaga | B60R 19/483 |
| 11,572,011 B1 * | 2/2023 | Carrillo Fernandez | B60Q 1/0441 |
| 2002/0149214 A1 | 10/2002 | Evans | |
| 2007/0090931 A1 | 4/2007 | Hawes et al. | |
| 2007/0176441 A1 * | 8/2007 | Lau | B60R 19/52 293/115 |
| 2009/0024323 A1 | 1/2009 | Tanabe | |
| 2011/0317014 A1 * | 12/2011 | Onaka | B60Q 1/1469 348/148 |

(Continued)

FOREIGN PATENT DOCUMENTS

| | | | | |
|---|---|---|---|---|
| DE | 102016113563 A1 | 1/2017 | | |
| DE | 202017102639 U1 * | 7/2017 | ........... | B60Q 1/0011 |

(Continued)

*Primary Examiner* — Lori Lyjak
(74) *Attorney, Agent, or Firm* — Young Basile Hanlon & MacFarlane, P.C.

(57) ABSTRACT

A vehicle is disclosed that includes: a grille supporting a functional accessory; a bumper beam that is located (positioned) axially inward of the grille; and a first energy absorber that is connected to the bumper beam. The first energy absorber defines a cavity that is configured to accommodate inward axial displacement of the grille resulting from a low-force impact between the vehicle and an external object to thereby inhibit damage to the functional accessory.

20 Claims, 5 Drawing Sheets

(56) References Cited

U.S. PATENT DOCUMENTS

| | | | |
|---|---|---|---|
| 2013/0107046 A1* | 5/2013 | Forgue | B60R 19/52 348/148 |
| 2015/0266438 A1* | 9/2015 | Ghannam | B60R 19/18 293/117 |
| 2016/0068127 A1* | 3/2016 | Faruque | B60R 19/18 293/117 |
| 2016/0137230 A1* | 5/2016 | Taneda | B62D 25/085 296/193.09 |
| 2016/0280164 A1* | 9/2016 | Hammer | B60R 19/18 |
| 2017/0008474 A1* | 1/2017 | Wey | B60R 19/52 |
| 2017/0259754 A1* | 9/2017 | Gong | G09F 21/04 |
| 2018/0281666 A1* | 10/2018 | Salter | B60Q 1/0035 |
| 2018/0290612 A1 | 10/2018 | Ikeno | |
| 2019/0023206 A1 | 1/2019 | Yoshida et al. | |
| 2019/0161041 A1* | 5/2019 | Fernandez | B60R 19/023 |
| 2020/0103522 A1* | 4/2020 | Singh | B60R 19/483 |
| 2020/0172035 A1* | 6/2020 | Rahman | B60R 19/48 |
| 2020/0262377 A1* | 8/2020 | Salter | B60Q 1/2661 |
| 2021/0053521 A1* | 2/2021 | Rahman | B60R 19/18 |
| 2023/0060152 A1* | 3/2023 | Gonzalez | B60K 11/08 |

FOREIGN PATENT DOCUMENTS

| | | | | |
|---|---|---|---|---|
| DE | 102020107145 A1 * | 9/2020 | | B60R 13/005 |
| KR | 20040049393 A | 6/2004 | | |
| WO | 2016/136165 A1 | 9/2016 | | |
| WO | WO-2020175507 A1 * | 9/2020 | | B60R 13/005 |

* cited by examiner

ENERGY ABSORBER FOR FRONT-END VEHICLE PROTECTION

TECHNICAL FIELD

The present disclosure relates to energy absorbers that are configured to inhibit (if not entirely prevent) damage to, and/or dislocation of, various functional accessories located at the front and/or rear-end of a vehicle by absorbing the forces, shock, etc., resulting from low-force impacts with the vehicle.

BACKGROUND

Many vehicles include one or more functional accessories (components) that are located at the front and/or rear-end such as, sensors (e.g., radar sensors, emergency braking sensors, intelligent cruise control sensors, pedestrian sensors, etc.), forward and/or rear image capture devices, and/or emblems. Often times, these functional accessories are mounted to, supported by, or otherwise associated with the front and/or rear bumper beams or the vehicle grille, which makes them susceptible to damage, dislocation, or other such disruption in the event of a low-force impact. To address this concern, the present disclosure describes energy absorbers that are configured to absorb the forces, shock, etc., resulting from low-force impacts to thereby protect the functional accessory(ies) and inhibit (if not entirely prevent) damage and/or dislocation.

SUMMARY

In one aspect of the present disclosure, a vehicle is disclosed that includes: a grille supporting a functional accessory; a bumper beam that is located (positioned) axially inward of the grille; and a first energy absorber that is connected to the bumper beam. The first energy absorber defines a cavity that is configured to accommodate inward axial displacement (deflection) of the grille resulting from a low-force impact between the vehicle and an external object to thereby inhibit damage to the functional accessory.

In certain embodiments, the functional accessory may include at least one of an emblem and an image capture device (ICD).

In certain embodiments, the cavity may define an axial dimension (e.g., a depth) that extends in generally parallel relation to a length of the vehicle, and which lies substantially within the range of approximately 35 mm to approximately 65 mm.

In certain embodiments, the first energy absorber may be configured such that the cavity is generally aligned with the functional accessory.

In certain embodiments, the first energy absorber may define a first lateral end and a second lateral end opposite to the first lateral end.

In certain embodiments, the cavity may be located adjacent to the second lateral end.

In certain embodiments, the first energy absorber may define: a first end wall at the first lateral end; a second end wall at the second lateral end; and an intermediate end wall that is located between the first end wall and the second end wall.

In certain embodiments, the cavity may extend between the intermediate end wall and the second end wall.

In certain embodiments, the functional accessory may define a first lateral end and a second lateral end opposite to the first lateral end.

In certain embodiments, the intermediate end wall of the first energy absorber may be generally aligned with the first lateral end of the functional accessory. Alternatively, the intermediate end wall of the first energy absorber may be spaced laterally outward of the first lateral end of the functional accessory.

In certain embodiments, the first energy absorber may include a base wall that defines a lower end of the cavity.

In certain embodiments, the base wall may be configured for contact with an inner surface of the grille upon the inward axial displacement (deflection) thereof.

In certain embodiments, the base wall may subtend an angle with a reference plane that extends in generally parallel relation to the length of the vehicle.

In certain embodiments, the angle subtended by the base wall and the reference plane may lie substantially within the range of approximately 10 degrees to approximately 15 degrees.

In certain embodiments, the vehicle may further include a second energy absorber that is connected to the bumper beam.

In certain embodiments, the second energy absorber may be positioned (vertically) below the first energy absorber.

In certain embodiments, the first energy absorber may define a first density and the second energy absorber may define a second density that is different (e.g., less) than the first density.

In another aspect of the present disclosure, a vehicle is disclosed that includes: a grille supporting a functional accessory; a bumper beam that is located (positioned) axially inward of the grille; and first and second energy absorbers that are each connected to the bumper beam. The first energy absorber includes a first body having a first density and a flange that extends axially from the first body. The first body defines a cavity that is generally aligned with the functional accessory and which is configured to receive and accommodate inward axial displacement (deflection) of the grille resulting from a low-force impact between the vehicle and an external object to thereby inhibit damage to the functional accessory. The second energy absorber is positioned (vertically) below the first energy absorber and includes a second body having a second density that is different than the first density.

In certain embodiments, the first density may be greater than the second density.

In certain embodiments, the first energy absorber may define a first lateral end and a second lateral end opposite to the first lateral end.

In certain embodiments, the flange may extend from the first lateral end to the second lateral end.

In certain embodiments, the bumper beam may define a first lateral end and a second lateral end opposite to the first lateral end.

In certain embodiments, the second energy absorber may extend from the first lateral end of the bumper beam to the second lateral end of the bumper beam.

In certain embodiments, the first energy absorber may define a first lateral dimension (e.g., a width) and the second energy absorber may define a second lateral dimension (e.g., a width) that is greater than the first lateral dimension.

In another aspect of the present disclosure, a method is disclosed for protecting a functional accessory that is supported by a grille in a vehicle during a low-force impact between the vehicle and an external object. The method includes securing an energy absorber to a bumper beam of the vehicle such that a cavity defined by the energy absorber is positioned to accommodate inward axial displacement (deflection) of the grille resulting from the low-force impact.

In certain embodiments, securing the energy absorber to the bumper beam may include positioning the energy absorber such that the cavity and the functional accessory are generally aligned along a lateral dimension (e.g., a width) of the vehicle.

In certain embodiments, securing the energy absorber to the bumper beam may include positioning the energy absorber such that a base wall defining a lower end of the cavity subtends an angle with a reference plane that extends in generally parallel relation to a length of the vehicle.

In certain embodiments, the angle subtended by the base wall and the reference plane may lie substantially within the range of approximately 10 degrees to approximately 15 degrees.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes various embodiments of energy absorbers for use with vehicles to absorb the forces, shock, etc., resulting from a low-force impact with an external object (e.g., other vehicles, structures, etc.), which may range from 2 mph to 5 mph (or more) depending upon the size, weight, and configuration of the external object(s). The energy absorbers described herein are configured to protect one or more functional accessories (components) in the vehicle, which may be positioned in any suitable location at the front and/or rear-end of the vehicle (e.g., on an end face of the front and/or rear bumper beam, on the vehicle grille, etc.). Suitable examples of such functional accessories include, but are not limited to, sensors, ICDs, and/or emblems.

Depending upon the particular application, the particular vehicle in which the energy absorber is employed, and/or the location and/or configuration of the functional accessory(ies), the specific configuration of the energy absorber may be varied. For example, in one embodiment of the disclosure, the functional accessory(ies) are supported by the vehicle grille and the energy absorber defines a cavity that is configured to accommodate inward deflection (e.g., rearward axial displacement) of the vehicle grille to thereby inhibit (if not entirely prevent) damage to the functional accessory(ies).

Figure 1:
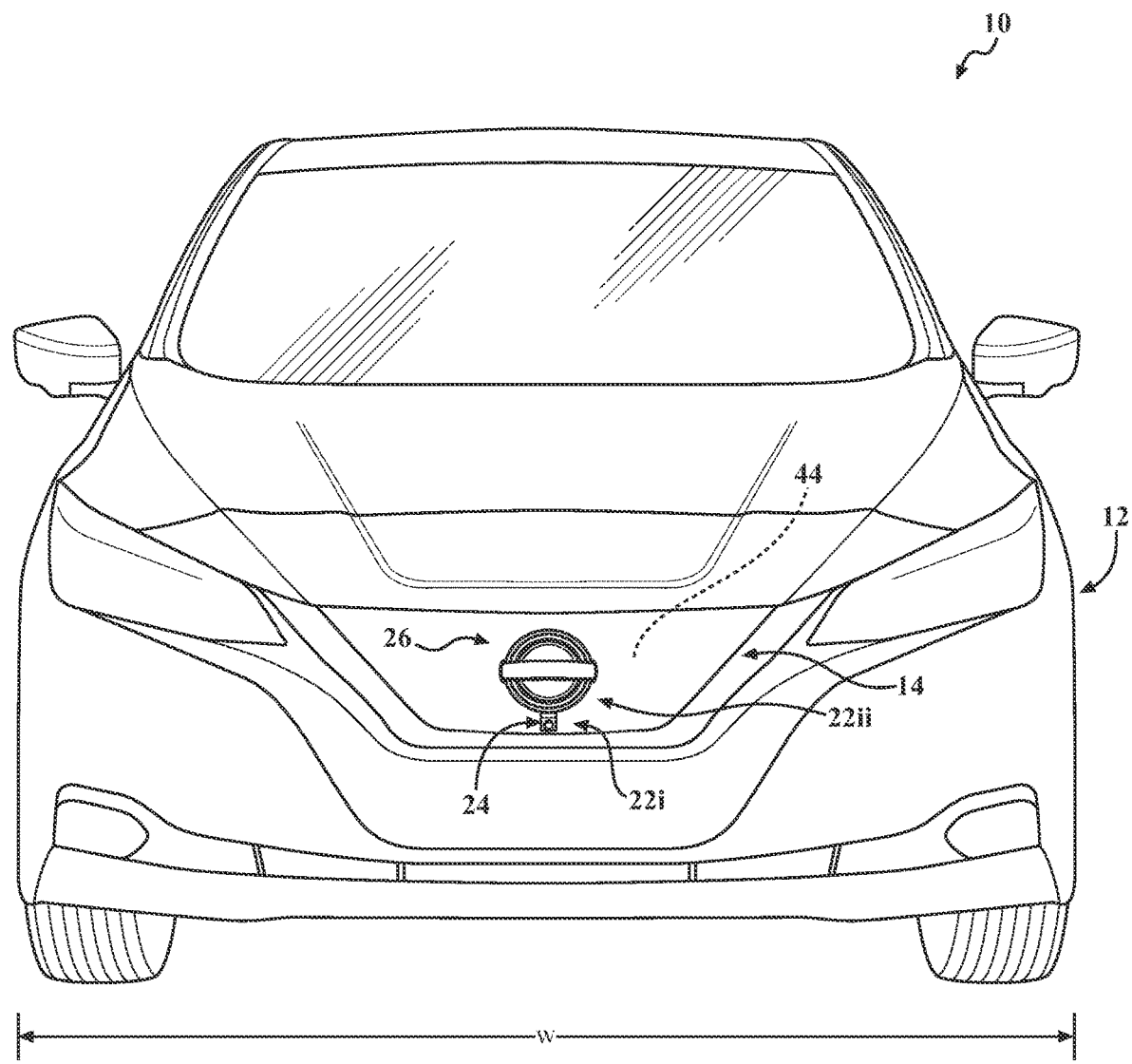
FIG. 1 is a plan view of a vehicle with a front-end that includes a grille supporting a first functional accessory, which is configured as an emblem, and a second functional accessory which is configured as a (forward) ICD.
Figure 2:
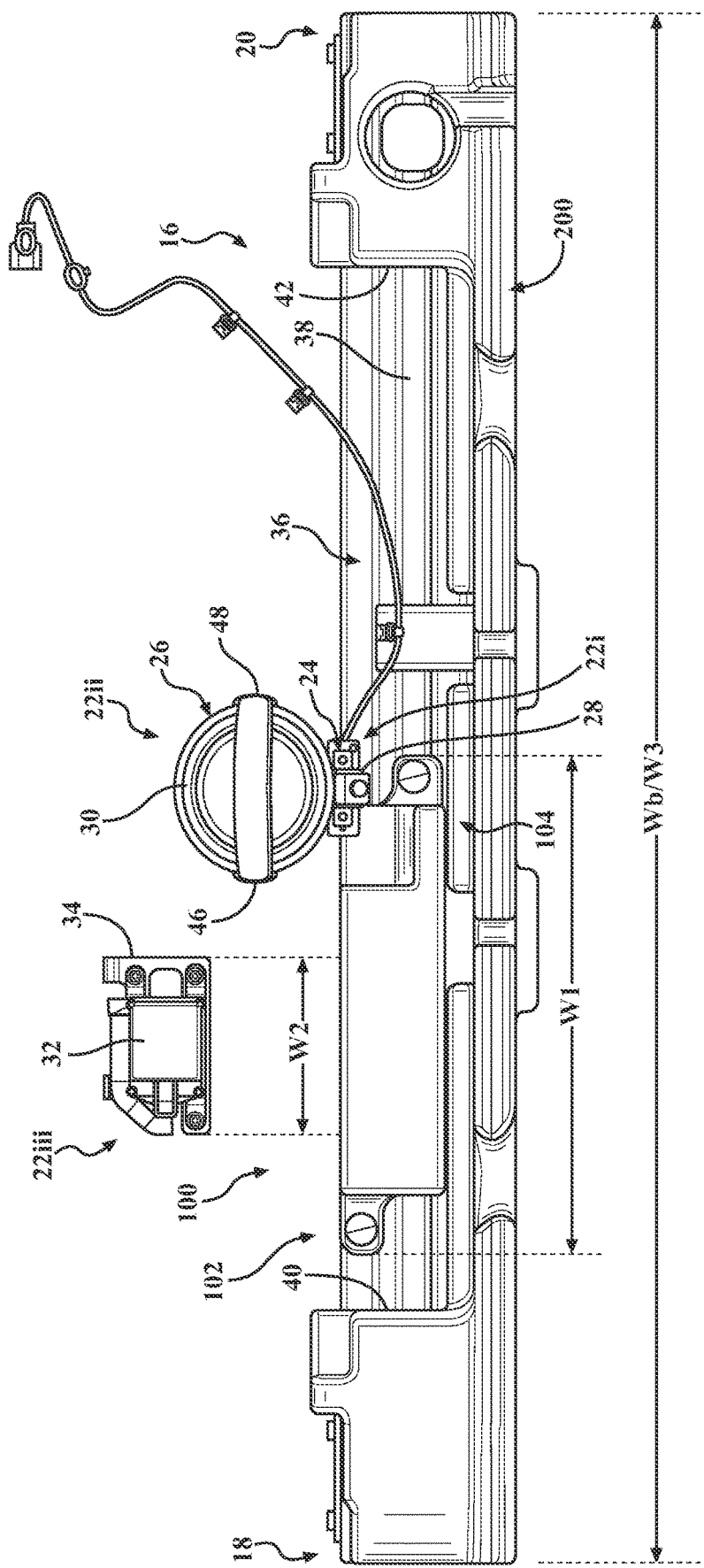
FIG. 2 is a partial, front view of the vehicle seen in FIG. 1 illustrating: the emblem; the ICD; a third functional accessory, which is configured as a sensor; a front-end bumper beam; and an energy absorber according to one embodiment of the present disclosure.

With reference now to FIGS. 1 and 2, a vehicle 10 is illustrated that includes a front-end 12 having a grille 14; a front-end bumper beam 16 having opposite (e.g., first and second) lateral ends 18, 20 and defining a lateral dimension Wb (e.g., a width) that is located (positioned) axially inward of (e.g., behind) the grille 14; a plurality of functional accessories 22; and a (first) energy absorber 100. Although generally illustrated and described as a passenger vehicle throughout the present disclosure, it should be appreciated that the components and functionality described herein may find applicability to wide variety of vehicles including, for example, trucks, SUVs, vans, motorcycles, etc.

The grille 14 supports respective first and second functional accessories 22i, 22ii (FIG. 1). More specifically, in the particular embodiment illustrated, the first functional accessory 22i is configured as a (forward-facing) image capture device (ICD) 24 and the second functional accessory 22ii is configured as an emblem 26 that is positioned vertically above, and axially inward of (e.g., behind), the ICD 24. It should be appreciated, however, that the number and/or functionality of the functional accessory(ies) 22i, 22ii supported by the grille 14 may be varied in alternate embodiments without departing from the scope of the present disclosure. For example, embodiments of the vehicle 10 are envisioned in which either the ICD 24 or the emblem 26 may be omitted, as are embodiment in which the grille 14 may support one or more additional functional accessories 22.

In the particular embodiment of the disclosure illustrated throughout the figures, the ICD 24 is configured as a digital camera 28 (FIG. 2). It should be appreciated, however, that the ICD 24 may include any device suitable for the intended purpose of capturing and/or recording images, video, sound, or other such data or information.

The emblem 26 includes an integrated light bar 30 (FIG. 2) and may be connected to any suitable power source in the vehicle (e.g., the battery, the alternator, etc.) to facilitate illumination of the emblem 26. In the particular embodiment of the disclosure illustrated, the emblem 26 and the light bar 30 each include a circular (or generally circular) configuration. It should be appreciated that the particular configuration of the emblem 26 and/or the light bar 30 may be varied in alternate embodiments without departing from the scope of the present disclosure (e.g., depending upon the style of the vehicle 10, the location of the emblem 26, the particular desired aesthetic appearance of the emblem 26, etc.).

With continued reference to FIGS. 1 and 2, the front-end 12 of the vehicle 10 includes a third functional accessory 22iii, which is configured as an electronic sensor 32, which may be any sensor suitable for use in the front-end 12 (or the rear-end) of the vehicle 10, including, for example, a radar-based sensor (e.g., an emergency braking sensor, an intelligent cruise control sensor, a pedestrian sensor, etc.). The electronic sensor 32 is supported by a mount 34, which facilitates connection to the vehicle 10 such that the electronic sensor 32 is fixedly positioned in relation to the bumper beam 16. It is envisioned that the electronic sensor 32 may be secured to the vehicle 10 in any suitable location (e.g., depending upon the configuration of the electronic sensor 32, spatial constraints, etc.). For example, in one particular embodiment, it is envisioned that the mount 34 may be connected to the battery charge port bracket (not shown) in the vehicle 10.

The first energy absorber 100 is fixed in relation to the bumper beam 16 and may be connected (secured) thereto, either directly or indirectly (i.e., via an intervening structure), using any suitable mechanism, structure, element, or combination thereof. For example, in the particular embodiment illustrated, the first energy absorber 100 is located within a recess (cavity) 36 defined by a (front, forward) end face 38 of the bumper beam 16 and sidewalls 40, 42 that extend axially forward from the end face 38 along an axial dimension L (FIG. 3) (e.g., a length) of the vehicle 10. More specifically, the first energy absorber 100 is fixedly connected to the end face 38 of the bumper beam 16 such that the first energy absorber 100 is positioned outwardly (i.e., axially forward) of the electronic sensor 32. When associated with a rear-end of the vehicle 10, it should be appreciated that the first energy absorber 100 may be likewise positioned in relation (and secured) to a (rear) end face of a rear-end bumper beam, which may be similar or identical to the bumper beam 16.

As seen in FIG. 2, the first energy absorber 100 defines a lateral dimension W1 (e.g., a width) that is greater than or equal to a lateral dimension W2 (e.g., a width) defined by the electronic sensor 32, each of which extends in parallel (or generally parallel) relation to the bumper beam 16 and in orthogonal (or generally orthogonal) relation to the axial dimension length L (FIG. 3) of the vehicle 10. The first energy absorber 100 is (laterally) aligned (or generally aligned) with the electronic sensor 32 along a lateral dimension W (FIG. 1) (e.g., a width) of the vehicle V such that the first energy absorber 100 spans the electronic sensor 32 (e.g., such that the electronic sensor 32 is positioned between opposite (e.g., first and second) lateral ends 102, 104 of the first energy absorber 100). Although shown as being eccentrically mounted to the bumper beam 16 (i.e., such that the first energy absorber 100 is located off-center) and (vertically) below the electronic sensor 32 (i.e., closer to the ground), in alternate embodiments, it is envisioned that the orientations of the first energy absorber 100 and the electronic sensor 32 may be varied. For example, depending upon the particular location of the electronic sensor 32, the configuration of the bumper beam 16, spatial requirements, packaging concerns, etc., it is envisioned that the first energy absorber 100 may be centrally mounted with respect to the bumper beam 16, that the first energy absorber 100 may be vertically aligned with the electronic sensor 32, or that the first energy absorber 100 may be positioned (vertically) above the electronic sensor 32 (i.e., such that the first energy absorber 100 is further from the ground).

The first energy absorber 100 may include (e.g., may be formed from) any material or combination of materials suitable for the intended purpose of absorbing forces generated during a low-force impact with the vehicle 10 that may otherwise result in the damage to, and/or dislocation (e.g., undesirable displacement) of, one or more of the functional accessory(ies) 22 (e.g., the ICD 24, the emblem 26, the electronic sensor 32, etc.), as discussed in further detail below. For example, in the particular embodiment shown throughout the figures, the first energy absorber 100 includes (e.g., is formed partially or entirely from) a foam (e.g., an expanded polypropylene foam) having a density that lies substantially within the range of (approximately) of 150 g/l to (approximately) 200 g/l. It should be understood, however, that embodiments of the first energy absorber 100 in which the density may lie outside the disclosed range are also envisioned herein and that such embodiments would not be beyond the scope of the present disclosure.

Figure 3:
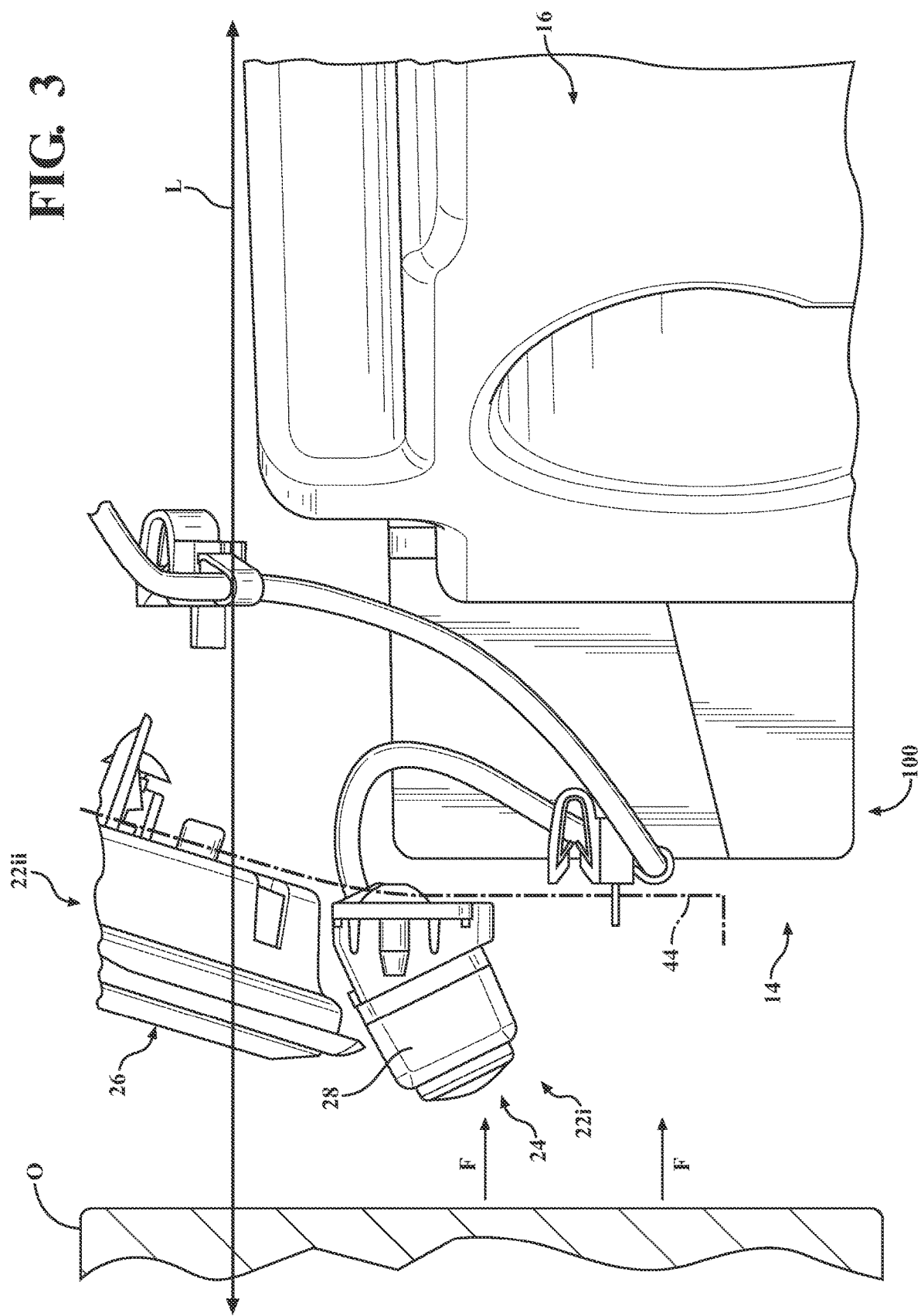
FIG. 3 is a side, plan view of the front-end of the vehicle illustrating: the emblem; the ICD; the front-end bumper beam; and the energy absorber.
Figure 4:
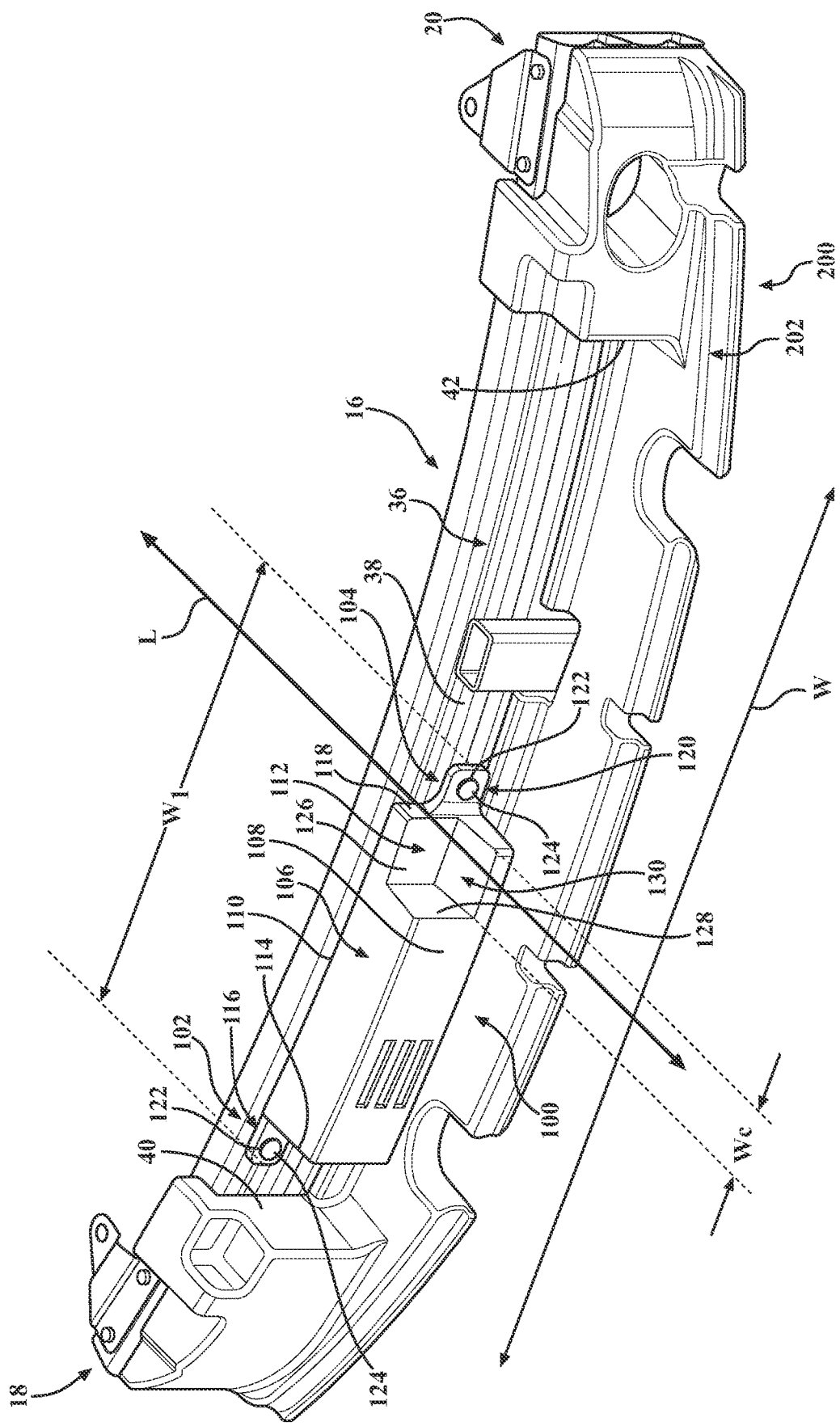
FIG. 4 is a front, perspective view of the energy absorber shown connected to the bumper beam.
Figure 5:
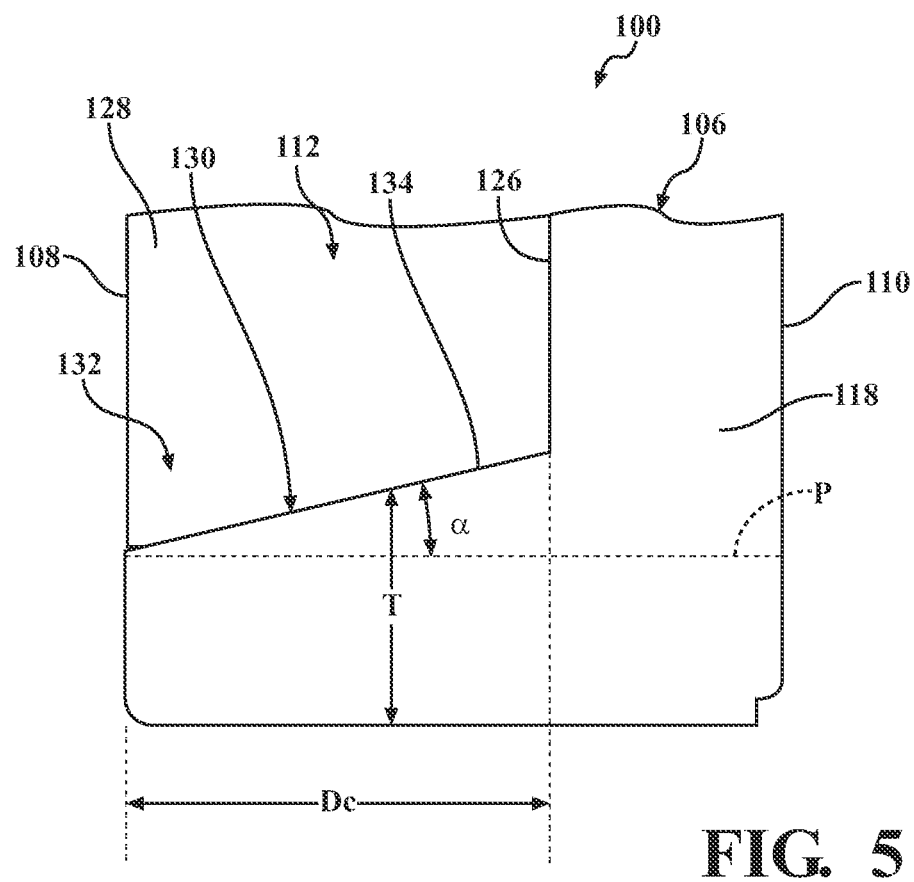
FIG. 5 is a side, schematic, plan view of the energy absorber.

With reference now to FIGS. 3-5 as well, the first energy absorber 100 includes a (first) body 106 that defines respective front (forward) and rear end faces 108, 110, each of which includes a planar (or generally planar) configuration, and a cavity 112.

The (first) lateral end 102 of the first energy absorber 100 defines a (first) end wall 114 and includes a (first) support 116 and the (second) lateral end 104 of the first energy absorber 100 defines a (second) end wall 118 and includes a (second) support 120. Each of the supports 116, 120 defines an aperture 122 that is configured to receive mechanical fasteners 124 (e.g., screws, rivets, pins, clips, bolts, etc.) that are insertable into corresponding openings (not shown) formed in the bumper beam 16, in either a fixed or removable manner. Additionally, or alternatively, it is envisioned that the first energy absorber 100 and the bumper beam 16 may include corresponding engagement members or surfaces (e.g., snaps, clips, hooks, etc.) that facilitate connection of the first energy absorber 100 to the bumper beam 16, such as, for example, in a snap-fit or interference-fit arrangement.

The cavity 112 extends axially rearward (e.g., from the front end face 108 towards the rear end face 110) and defines: a front (forward) wall 126; an intermediate end wall 128; and a base wall 130. The front wall 126 extends in parallel (or generally parallel) relation to the end faces 108, 110 is planar (or generally planar) in configuration. The intermediate end wall 128 is located between the end walls 114, 116 of the first energy absorber 100. The intermediate end wall 128 extends in orthogonal (or generally orthogonal) relation to the front wall 126 and is planar (or generally planar) in configuration. The base wall 130 extends between (and connects) the front wall 126 and the intermediate end wall 128 and extends from the front end face 108 to the front wall 126 so as to define a lower end 132 of the cavity 112. The base wall 130 includes a planar (or generally planar) configuration and defines an inclined, ramped surface 134 that is configured for engagement (contact) with an inner surface 44 (FIGS. 1, 3) of the grille 14 upon deflection, as discussed in further detail below.

In the particular embodiment illustrated throughout the figures, the cavity 112 is located adjacent to the (second) lateral end 104 of the energy absorber 100 and extends between the (second) end wall 118 and the intermediate end wall 128 towards the (first) lateral end 102. It should be appreciated, however, that the particular location of the cavity 112 may be varied in alternate embodiments without departing from the scope of the present disclosure (e.g., depending upon the particular number, location, and/or configuration of the functional accessory(ies) 22). For example, embodiments are envisioned in which the cavity 112 may be located adjacent to the lateral end 102 such that the cavity 112 extends towards the lateral end 104, as are embodiments in which the cavity 112 may be spaced laterally from each of the lateral ends 102, 104, either by equivalent or non-equivalent lateral distances (e.g., such that the cavity 112 is located centrally or eccentrically between the lateral ends 102, 104).

The cavity 112 is configured to accommodate inward (e.g., rearward) axial displacement (travel) of the grille 14 and/or the functional accessory(ies) 22*i*, 22*ii* resulting from a low-force impact between the vehicle 10 and an external object O (FIG. 3) (e.g., another vehicle, a shopping cart, a road barrier, etc.), which inhibits (if not entirely prevents) damage to, and/or dislocation of, the functional accessory(ies) 22*i*, 22*ii*, as described in further detail below. Although shown as including a single cavity 112 in the particular embodiment illustrated throughout the figures, it is envisioned that first energy absorber 100 may include a series (plurality) of cavities 112 in alternate embodiments of the present disclosure (e.g., based upon the particular number, location, and/or configuration of the functional accessory(ies) 22).

To accommodate such axial displacement, the cavity 112 is (laterally) aligned (or generally aligned) with the functional accessory(ies) 22i, 22ii (e.g., such that there is a measure of lateral overlap between the cavity 112 and the accessories 22i, 22ii along the lateral dimension W (FIG. 2) of the vehicle V). For example, in the particular embodiment illustrated throughout the figures, the emblem 26 defines opposite (first and second) lateral ends 46, 48 (FIG. 2), and the cavity 112 is positioned such that the intermediate end wall 128 defined by the cavity 112 is (laterally) aligned (or generally aligned) with the (first) lateral end 46 of the emblem 26, as seen in FIG. 2, for example. As described in further detail below, such lateral alignment allows the cavity 112 to receive (or partially receive) the emblem 26 and/or the ICD 24 upon deflection of the grille 14. In certain embodiments of the disclosure, however, it is envisioned that the cavity 112 may be configured such that the intermediate end wall 128 is located laterally outward of the (first) lateral end 46 of the emblem 26 (e.g., to account for and accommodate increased lateral deflection (travel) of the grille 14 and/or the functional accessory(ies) 22i, 22ii during the low-force impact).

With reference to FIGS. 4 and 5 in particular, the cavity 112 defines an axial dimension Dc (FIG. 5) (e.g., a depth) that extends in parallel (or generally parallel) relation to the axial dimension L of the vehicle 10 and a lateral dimension Wc (FIG. 4) (e.g., a width) that extends in orthogonal (or generally orthogonal) relation to the axial dimension Dc and in parallel (or generally parallel) relation to the lateral dimension W1 defined by the energy absorber 100. The axial dimension Dc of the cavity 112 extends between the front end face 108 and the front wall 126 and the lateral dimension Wc of the cavity 112 extends between the (second) end wall 118 and the intermediate end wall 128. In the particular embodiment of the first energy absorber 100 illustrated throughout the figures, the cavity 112 is configured such that the axial dimension Dc and the lateral dimension Wc are equivalent (or substantially equivalent), and each lie substantially within the range of (approximately) 35 mm to (approximately) 65 mm. It should be appreciated, however, that the particular respective axial and/or lateral dimensions Dc, Wc of the cavity 112 may be varied in alternate embodiments without departing from the scope of the present disclosure (e.g., depending upon the particular configuration of the grille 14 and/or the functional accessory(ies) 22i, 22ii). As such, embodiments of the first energy absorber 100 in which the lateral dimension Wc exceeds the axial dimension Dc are envisioned herein, as are embodiments in which the axial dimension Dc exceeds the lateral dimension Wc. Additionally, it should be understood that embodiments of the first energy absorber 100 in which the lateral dimension Wc and/or the axial dimension Dc may lie outside the aforementioned range of values are also envisioned herein and that such embodiments would not be beyond the scope of the present disclosure.

With continued reference to FIGS. 4 and 5, the base wall 130 is angled vertically upward and subtends an acute angle α (FIG. 5) with a (horizontal) reference plane P that extends in parallel (or generally parallel) relation to the axial dimension L (FIG. 3) of the vehicle 10 and in orthogonal (or generally orthogonal) relation to the lateral dimension W1 of the first energy absorber 100. In the particular embodiment of the first energy absorber 100 illustrated throughout the figures, the cavity 112 is configured such that the angle α lies substantially within the range of (approximately) 10 degrees to (approximately) 15 degrees. It should be understood, however, that embodiments of the first energy absorber 100 in which the angle α may lie outside the disclosed range are also envisioned herein (e.g., depending upon the particular configuration of the grille 14 and/or the functional accessory(ies) 22i, 22ii) and that such embodiments would not be beyond the scope of the present disclosure.

The angled configuration and inclination of the base wall 130 facilitates contact (engagement) with the inner surface 44 (FIGS. 1, 3) of the grille 14 during the low-force impact, which limits deflection (travel) of the grille 14 and, thus, axial displacement of the functional accessory(ies) 22i, 22ii, thereby inhibiting (if not entirely preventing) damage that might otherwise occur, as described in further detail below. Additionally, the angled configuration of the base wall 130 allows for an increase in the (vertical) thickness T (FIG. 5) of the first energy absorber 100 adjacent to the cavity 112 (e.g., at the lateral end 104, thereby increasing the overall strength and the force-absorption capabilities of the first energy absorber 100. Moreover, the angled configuration of the base wall 130 simplifies manufacturing of the first energy absorber 100 during an injection molding process by facilitating extraction from the mold (or other such apparatus, device, or machine).

With reference now to FIGS. 1-5, use and functionality of the first energy absorber 100 will be discussed during a low-force impact between the vehicle 10 and the external object O (FIG. 3). Upon impact with the object O, the grille 14 (FIGS. 1, 3) is deflected axially inward (rearwardly, towards the first energy absorber 100) as force F is applied to the vehicle 10 in the direction indicated in FIG. 3. The force F, however, is interrupted and absorbed by the energy absorber 100, which inhibits (if not entirely prevents) any transmission to the functional accessory(ies) 22 and thereby protects the functional accessory(ies) 22 so as to inhibit (if not entirely prevent) any damage and/or dislocation.

As the grille 14 deflects axially inward, the inner surface 44 of the grille 14 is brought into engagement (contact) with the ramped surface 134 (FIG. 5) of the base wall 130, which acts as a backstop and limits travel of the grille 14, thereby providing for additional force absorption. During deflection, as the grille 14 travels rearwardly, the accessory 22i (and the accessory 22ii) are received by the cavity 112, which inhibits (if not entirely prevents) the application of any (additional) force to the accessory 22i (and/or the accessory 22ii) that may otherwise result in compression and/or damage. For example, reception of the accessory 22i by the cavity inhibits (if not entirely prevents) vertically upward displacement of the accessory 22ii and the resulting damage that may otherwise occur.

The force-absorption facilitated by the first energy absorber 100 reduces any likelihood that the functional accessory(ies) 22 may malfunction after the low-force impact as well as the need for repair or replacement. The first energy absorber 100, thus, reduces the overall cost associated with ownership and operation of the vehicle 10. By protecting the functional accessory(ies) 22, it is also envisioned that the first energy absorber 100 may increase the likelihood that the vehicle 10 will remain in compliance with any applicable regulations and/or safety requirements following the low-force impact.

With reference now to FIGS. 2 and 4, in certain embodiments, such as that illustrated throughout the figures, the vehicle 10 may include a second energy absorber 200 to increase force-absorption during a low-force impact with the vehicle 10. The second energy absorber 200 is fixedly connected to the bumper beam 16, and may be secured thereto, either directly or indirectly (i.e., via an intervening structure), using any suitable mechanism, structure, element, or combination thereof. For example, it is envisioned that the second energy absorber 200 may be fixedly connected to the (front, forward) end face 38 of the bumper beam 16, to a lowermost surface of the bumper beam 16, or in any other suitable location. In the particular embodiment illustrated throughout the figures, the second energy absorber 200 extends from the (first) lateral end 18 of the bumper beam 16 to the (second) lateral end 20 so as to define a (second) lateral dimension W3 (FIG. 2) (e.g., a width) that exceeds the lateral dimension W1 defined by the first energy absorber 100 and approximates (or is equivalent to) the lateral dimension Wb of the bumper beam 16. Embodiments are also envisioned, however, in which the lateral dimension W3 defined by the second energy absorber 200 may be less than the lateral dimension Wb of the bumper beam 16 (e.g., depending upon the particular configuration of the bumper beam 16 and/or the first energy absorber 100, spatial requirements, packaging concerns, etc.), and would not be beyond the scope of the present disclosure.

The second energy absorber 200 includes a (second) body 202 and is positioned (vertically) below the first energy absorber 100 such that the second energy absorber 200 extends outwardly (i.e., axially forward) of the first energy absorber 100. When associated with the rear-end of the vehicle 10, it should be appreciated that the second energy absorber 200 may be likewise positioned in relation (and secured to) the rear (end face) of the rear-end bumper beam, which, as mentioned above, may be similar or identical to the bumper beam 16.

The second energy absorber 200 may include (e.g., may be formed from) any material or combination of materials suitable for the intended purpose of absorbing forces generated during a low-force impact with the vehicle 10. For example, it is envisioned that the second energy absorber 200 may include (e.g., may be formed partially or entirely from) a foam having a (second) density that is different from (e.g., less than) the (first) density defined by the first energy absorber 100. More specifically, in the particular embodiment of illustrated throughout the figures, the second energy absorber 200 includes a foam (e.g., an expanded polypropylene foam) having a density that lies substantially within the range of (approximately) of 30 g/l to (approximately) 50 g/l. It should be understood, however, that embodiments of the second energy absorber 200 in which the density may lie outside the disclosed range are also envisioned herein and that such embodiments would not be beyond the scope of the present disclosure. Additionally, it should be appreciated that the particular densities of the materials used in construction of the energy absorbers 100, 200 may be chosen to achieve any desired results. For example, the present disclosure contemplates embodiments in which the material(s) of construction are chosen such that the densities of the energy absorbers 100, 200 achieve a ratio that lies substantially within the range of 3:1 to 7:1, as well as embodiments in which the densities of the energy absorbers 100, 200 may be equivalent (or approximately equivalent) and embodiments in which the density of the second energy absorber 200 may exceed that of the first energy absorber 100.

Figure 6:
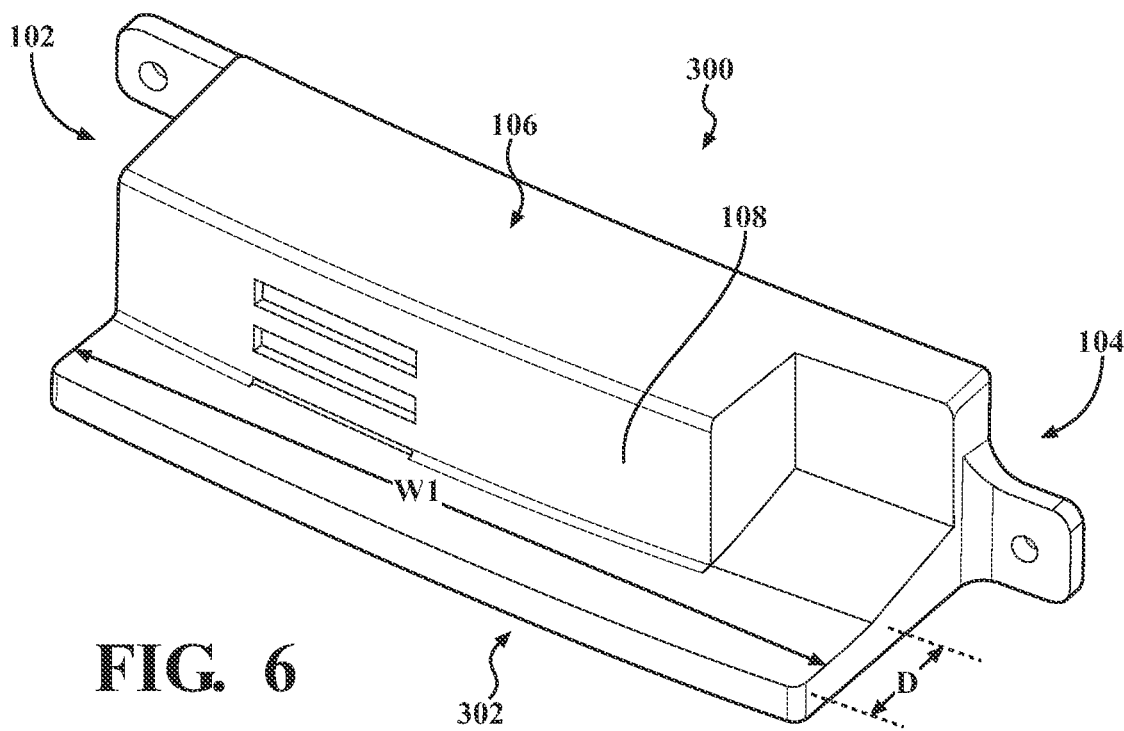
FIG. 6 is a front, perspective view illustrating an alternate embodiment of the energy absorber.

With reference now to FIG. 6, an alternate embodiment of the first energy absorber 100 will be discussed, which is identified by the reference character 300. The first energy absorber 300 is substantially similar in both structure and function to the first energy absorber 100 discussed above, and accordingly, in the interest of brevity, will be discussed only with respect to any differences therefrom. As such, identical reference characters will be utilized to refer to elements, structures, features, etc., common to the first energy absorbers 100, 300.

The first energy absorber 300 includes a flange 302 that extends (projects) axially (e.g., forward) from the body 106 (e.g., the front end face 108) so as to increase the force absorption characteristics of the first energy absorber 300. Although shown as being integrally formed with the body 106 in the particular embodiment illustrated, it is also envisioned that the flange 302 and the body 106 may be formed as separate, discrete structures that may be connected together in any suitable manner (e.g., via one or more mechanical fasteners, an adhesive, a tie, a tether, etc.).

In the particular embodiment illustrated, the flange 302 extends continuously (e.g., uniformly) from the (first) lateral end 102 of the first energy absorber 300 to the (second) lateral end 104 such that the flange 302 spans the lateral dimension W1 of the first energy absorber 300 in its entirety. Embodiments are also envisioned, however, in which the flange 302 may span only a portion of the lateral dimension W1 of the first energy absorber 300, as are embodiments in which the flange 302 may extend discontinuously (e.g., non-uniformly) between the lateral ends 102, 104 (e.g., so as to define a series of discrete projections that extend from the front end face 108).

In the particular embodiment illustrated in FIG. 6, the flange 302 extends from the front end face 108 so as to define an axial dimension D (e.g., a depth) that extends in orthogonal (or generally orthogonal) relation to the lateral dimension W1 and lies substantially within the range of (approximately) 20 mm to (approximately) 50 mm. It should be understood, however, that embodiments in which the axial dimension D of the flange 302 may lie outside the disclosed range of values are also envisioned herein and that such embodiments would not be beyond the scope of the present disclosure.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments. For example, although generally discussed in the context of the front-end of the vehicle 10 (FIG. 1) herein, as mentioned above, it should be appreciated that any of the various embodiments of the presently disclosed energy absorber may be utilized in the rear-end of the vehicle 10 as well.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle, comprising:
a grille supporting a functional accessory;
a bumper beam located axially inward of the grille; and
a first energy absorber connected to the bumper beam and defining a cavity configured to accommodate inward axial displacement of the grille resulting from a low-force impact between the vehicle and an external object to thereby inhibit damage to the functional accessory.

2. The vehicle of claim 1, wherein the functional accessory includes at least one of an emblem and an image capture device.

3. The vehicle of claim 1, wherein the cavity defines an axial dimension extending in generally parallel relation to a length of the vehicle that lies substantially within a range of approximately 35 mm to approximately 65 mm.

4. The vehicle of claim 1, wherein the first energy absorber is configured such that the cavity is generally aligned with the functional accessory.

5. The vehicle of claim 4, wherein the first energy absorber defines a first lateral end and a second lateral end opposite to the first lateral end, the cavity being located adjacent to the second lateral end.

6. The vehicle of claim 5, wherein the first energy absorber defines:
a first end wall at the first lateral end;
a second end wall at the second lateral end; and
an intermediate end wall located between the first end wall and the second end wall, the cavity extending between the intermediate end wall and the second end wall.

7. The vehicle of claim 6, wherein the functional accessory defines a first lateral end and a second lateral end opposite to the first lateral end, the intermediate end wall of the first energy absorber being generally aligned with the first lateral end of the functional accessory.

8. The vehicle of claim 6, wherein the functional accessory defines a first lateral end and a second lateral end opposite to the first lateral end, the intermediate end wall of the first energy absorber being spaced laterally outward of the first lateral end of the functional accessory.

9. The vehicle of claim 1, wherein the first energy absorber includes a base wall defining a lower end of the cavity, the base wall being configured for contact with an inner surface of the grille upon the inward axial displacement thereof.

10. The vehicle of claim 9, wherein the base wall subtends an angle with a reference plane extending in generally parallel relation to a length of the vehicle that lies substantially within a range of approximately 10 degrees to approximately 15 degrees.

11. The vehicle of claim 1, further comprising a second energy absorber connected to the bumper beam and positioned below the first energy absorber.

12. The vehicle of claim 11, wherein the first energy absorber defines a first density and the second energy absorber defines a second density different than the first density.

13. A vehicle, comprising:
a grille supporting a functional accessory;
a bumper beam located axially inward of the grille;
a first energy absorber connected to the bumper beam, the first energy absorber including:
a first body having a first density, the first body defining a cavity generally aligned with the functional accessory and configured to receive and accommodate inward axial displacement of the grille resulting from a low-force impact between the vehicle and an external object to thereby inhibit damage to the functional accessory; and
a flange extending axially from the first body; and
a second energy absorber connected to the bumper beam and positioned below the first energy absorber, the second energy absorber including a second body having a second density different than the first density.

14. The vehicle of claim 13, wherein the first density is greater than the second density.

15. The vehicle of claim 13, wherein the first energy absorber defines a first lateral end and a second lateral end opposite to the first lateral end, the flange extending from the first lateral end to the second lateral end.

16. The vehicle of claim 15, wherein the bumper beam defines a first lateral end and a second lateral end opposite to the first lateral end, the second energy absorber extending from the first lateral end of the bumper beam to the second lateral end of the bumper beam.

17. The vehicle of claim 16, wherein the first energy absorber defines a first lateral dimension and the second energy absorber defines a second lateral dimension greater than the first lateral dimension.

18. A method of protecting a functional accessory supported by a grille in a vehicle during a low-force impact between the vehicle and an external object, the method comprising:
securing an energy absorber to a bumper beam of the vehicle such that a cavity defined by the energy absorber is positioned to accommodate inward axial displacement of the grille resulting from the low-force impact.

19. The method of claim 18, wherein securing the energy absorber to the bumper beam includes positioning the energy absorber such that the cavity and the functional accessory are generally aligned along a lateral dimension of the vehicle.

20. The method of claim 18, wherein securing the energy absorber to the bumper beam includes positioning the energy absorber such that a base wall defining a lower end of the cavity subtends an angle with a reference plane extending in generally parallel relation to a length of the vehicle that lies substantially within a range of approximately 10 degrees to approximately 15 degrees.

* * * * *